Dec. 7, 1926.

P. A. BUCK 1,609,605

COLLAPSIBLE SEAT FOR MOTOR VEHICLES

Filed August 10, 1925  2 Sheets-Sheet 1

Inventor
Petrmann A. Buck

By Harding Catlin
Attorneys

Dec. 7, 1926.

P. A. BUCK 1,609,605

COLLAPSIBLE SEAT FOR MOTOR VEHICLES

Filed August 10, 1925   2 Sheets-Sheet 2

Inventor
Pitman A. Buck

By Hardway Cather
Attorneys

Patented Dec. 7, 1926.

1,609,605

UNITED STATES PATENT OFFICE.

PITMANN A. BUCK, OF HOUSTON, TEXAS.

COLLAPSIBLE SEAT FOR MOTOR VEHICLES.

Application filed August 10, 1925. Serial No. 49,337.

This invention relates to new and useful improvements in a collapsible seat for motor vehicles.

One object of the invention is to provide a collapsible seat specially designed to be used on motor vehicles of the roadster type, and which, when not in use may be collapsed within the vehicle body without occupying any considerable portion of the carrying space within said body.

Another object of the invention is to provide a collapsible seat of the character described which may be readily operated, that is actuated into active or collapsed position, by the driver located on the front seat of the vehicle.

A further feature of the invention resides in the provision of a collapsible seat, of the character described which is of very simple structure, and may accordingly be cheaply produced, readily installed, and easily operated.

With the above and other objects in view this invention has particular relation to certain novel features of construction, operation and arrangement of parts an example of which is given in this specification and illustrated in the accompanying drawings, wherein:—

Figure 1:
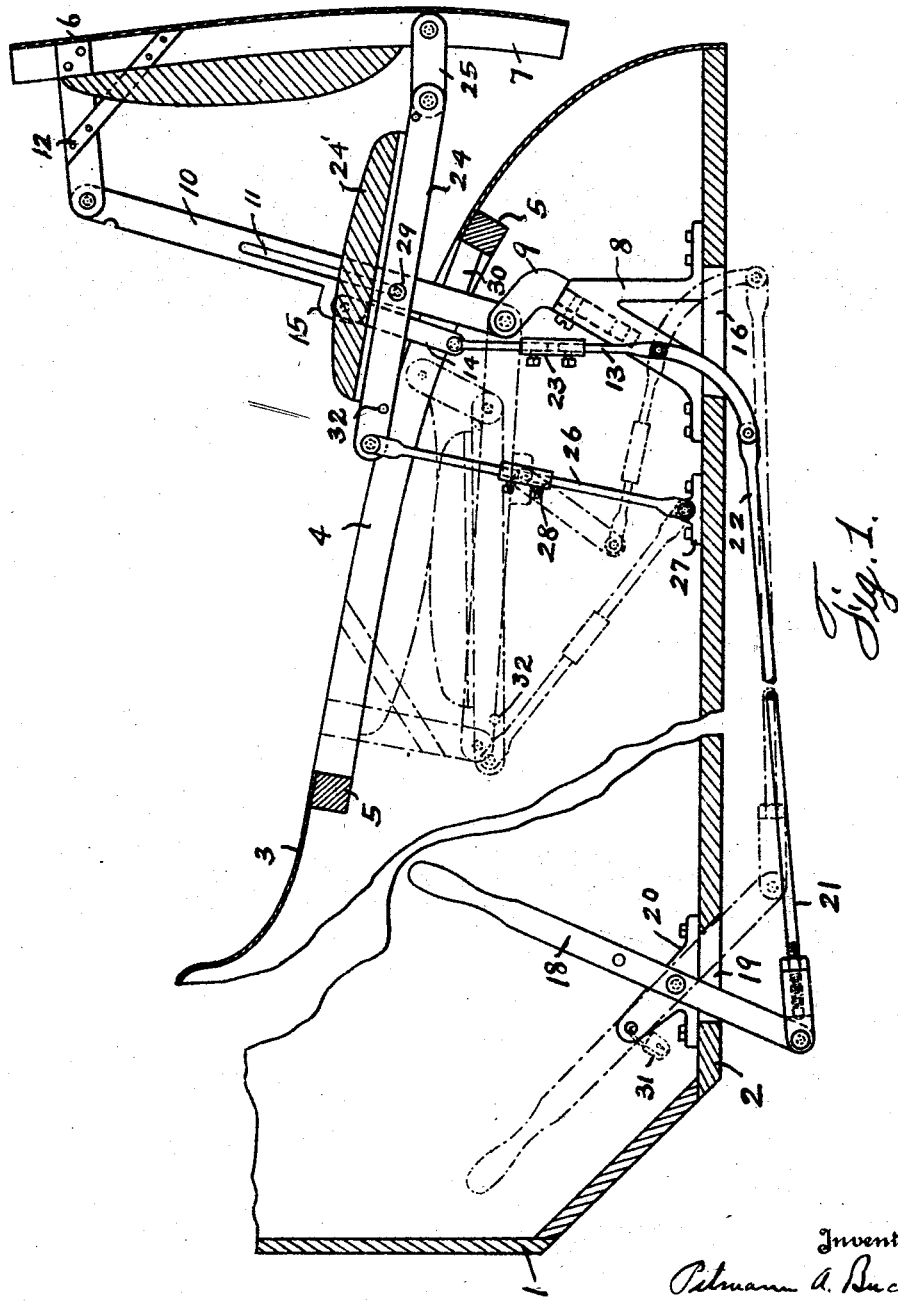
Figure 2:
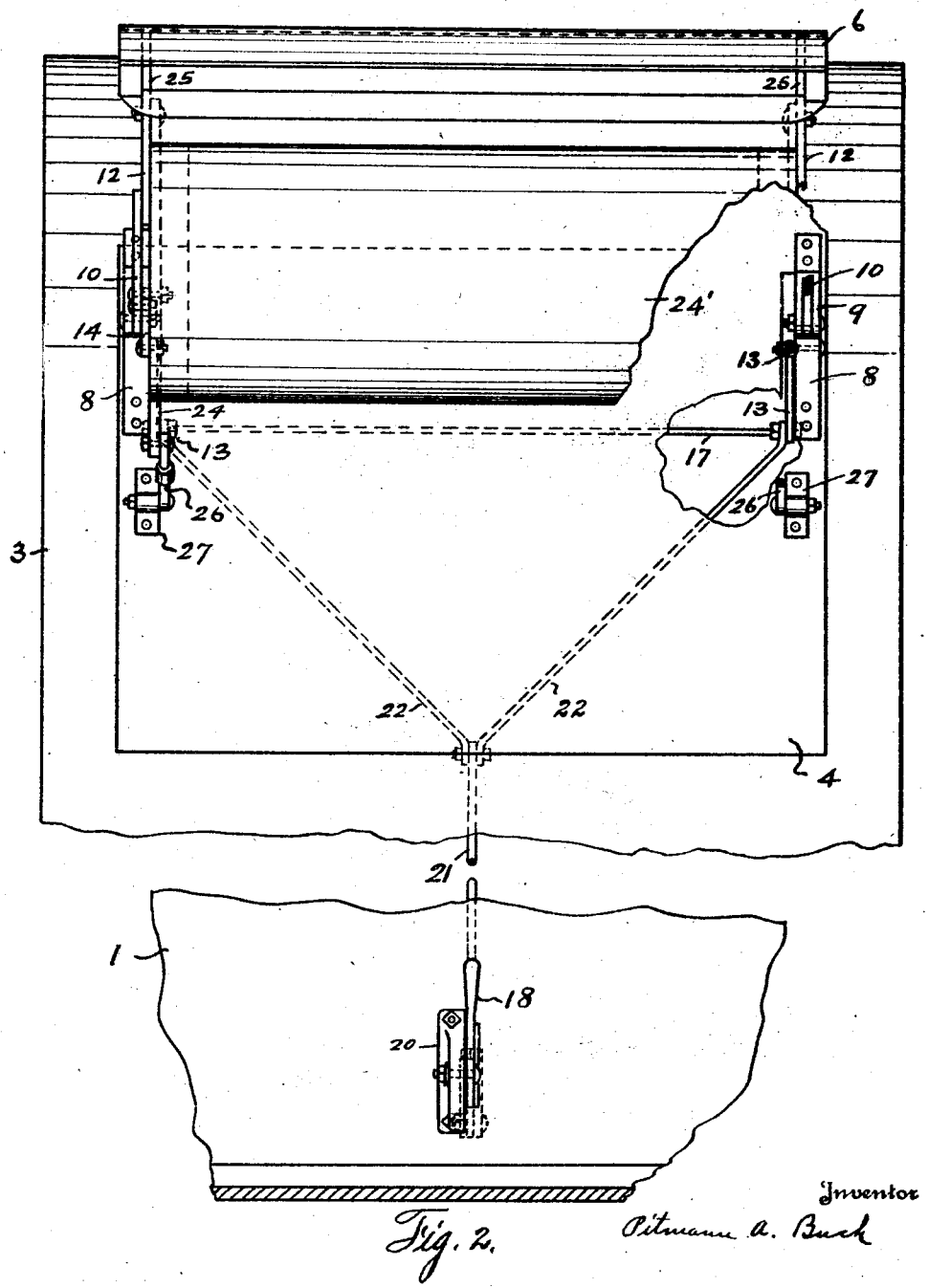

Figure 1 shows a fragmentary longitudinal sectional view of a vehicle body showing the seat applied thereto, and Figure 2 shows a fragmentary plan view, showing parts of the seat broken away, and parts in section.

Referring now more particularly to the drawings, wherein like numerals of reference designate similar parts in each of the figures, the numeral 1 designates the body of a motor vehicle of the roadster type, the rear portion of which has the bottom 2. This portion of the body is enclosed above and on the sides and rear by the sheet metal covering 3, commonly known as the turtle deck, in this type of vehicle. This turtle deck has an opening 4 in its upper part, surrounded by the frame 5, which is concealed from view within the body. This opening 4 is normally closed by the cover 6 which is formed of sheet metal fastened to a frame consisting of the side members 7, 7. This cover, when closed is flush with the adjacent parts of the body and forms a smooth, continuous surface therewith. The under side of this cover is upholstered and when the cover is swung into vertical position it forms a back rest.

Fastened to the floor 2, of the body, on each side, there are the brackets 8, 8 and a bearing member 9 is vertically adjustable in each bracket and its upper end is forwardly turned. An arm, as 10, is pivoted at its rear end, to the forwardly turned end of each bearing member 9, each arm having a lengthwise slot as 11. The forward ends of these arms are pivoted to the lower ends of the respective brackets 12 which are fastened to, and depend from, the frame of the cover 6.

Pivoted to the inner side of each bracket 8 there is a lever 13, and the links 14 are pivoted at their lower ends to the upper ends of the levers 13, and at their upper ends to the lugs 15 which are carried by the under sides of the arms 10, intermediate their ends. The lower ends of the levers 13 extend through the aligned slots 16, in the floor 2, and are forwardly curved and connected by the brace rod 17.

An operating lever 18 works through a slot 19 in the front part of the body floor, and is pivoted to a bracket 20 fastened to said floor. A rod 21 is pivoted at its forward end to the lower end of the lever 18, and at its rear end this rod is pivoted to the forward ends of the bars 22, 22, which diverge rearwardly and are pivoted to the lower ends of the respective levers 13. The levers 13 are formed of two sections which are connected by, and are adjustable in, the sleeves 23.

There is a seat 24' whose ends are supported on the end supporting bars 24. The rear end of each bar 24 is connected to the corresponding side member 7, of the cover frame, by the connecting link 25, and the front end of each bar 24 is pivoted to the upper end of the corresponding supporting rod 26. The lower ends of these rods 26 are pivoted to the corresponding brackets 27 fastened to the floor of the body 1, and each of said rods is formed of two sections connected by the sleeve 28 in which they are adjustable. The side bars 24 lie adjacent the corresponding arms 10 and have the lateral studs 29 which run in the bearings 11. The lower end of each arm 10 has a stop 30, adapted to abut the rear side of the frame 5 to limit the rearward movement of the seat and to form a firm support therefor.

The seat is swung into active or collapsed position by means of the lever 18, and may be locked in the last named position, by locking said lever 18 with the bracket 20, by any suitable lock, as 31.

When the lever 18 is moved to forward position, as indicated in dotted lines in Figure 1, the levers 13 will be correspondingly moved and will operate through the links 14 and arms 10 to swing the cover 6 into closed position, as also indicated by dotted lines in Figure 1. As the cover swings into closed position the arms 10 will carry the supporting bars 24 and the seat carried thereby forwardly and downwardly, the studs 29 moving in the bearings 11, to permit this, and when in collapsed position the seat will lie parallel with and closely against the under side of said cover, with the forward ends of the arms 10 resting upon and being supported by the stops 32 carried by the forward ends of the respective supporting bars 24. When collapsed in this position the seat will occupy small space leaving ample space in the rear end of the body beneath it.

The seat may be swung into active position for use, by a reverse movement of the lever 18 by the driver in the front seat. The collapsible seat may thus be easily swung into either position by the operator of the vehicle without leaving his position at the steering wheel.

The seat 24' may be adjusted vertically by a suitable adjustment of the bearing members 9 and the levers 13 and rods 26, provision for which has been made as hereinbefore explained.

What I claim is:

1. The combination with a motor vehicle body, the rear portion of which has a floor and is enclosed above and on the sides and rear forming a turtle deck having an opening in its upper part, a frame surrounding said opening, a cover for said opening having a frame formed with side members, the under side of said cover being upholstered and forming a back rest when moved into vertical position, upstanding brackets fastened to the floor, one on each side, a bearing member adjustable in each bracket, the upper end of each bearing member being forwardly turned, arms pivoted at their rear ends to the forwardly turned ends of said bearing members, each arm having a lengthwise slot, brackets fastened to and depending from the under side of said cover, the other ends of said arms being pivoted to said depending brackets, a lever formed of adjustable sections and pivoted to each upstanding bracket, a link pivoted at its lower end to each lever, and pivoted at its upper end to the corresponding arm intermediate its ends, said floor having aligned slots through which said levers extend, the lower ends of said levers being forwardly curved, a brace rod connecting said forwardly curved ends of said levers, an operating lever pivotally connected to the floor, said floor having a slot through which said operating lever works, a rod pivoted at its forward end to the lower end of said operating lever, bars connecting the rear end of said rod with the forwardly curved lever ends, side supporting bars supporting a seat, connecting links connecting the rear ends of said side supporting bars to the corresponding side members of the cover frame, the front end of each bar being pivoted to the upper end of a corresponding supporting rod, brackets fastened to the flooring of the body to which the lower ends of the supporting rods are pivoted, each of said rods being formed of sections adjustably connected together, said side bars lying adjacent said arms, lateral studs carried by said supporting bars which work in the bearing slots of said arms, the lower end of each arm being provided with a stop adapted to abut the rear of said frame to limit the rearward movement of said seat.

2. The combination with a motor vehicle body, the rear portion of which has a floor and is enclosed above and on the sides and rear forming a turtle deck having an opening in its upper part, a frame surrounding said opening, a cover for said opening having a frame formed with side members, said cover forming a back rest when moved into vertical position, upstanding brackets fastened to the floor, one on each side, a bearing member vertically adjustable in each bracket, the upper end of each bearing member being forwardly turned, arms pivoted at their rear ends to the forwardly turned ends of said bearing members, each arm having a lengthwise slot, brackets fastened to and depending from the underside of said cover, the other ends of said arms being pivoted to said depending brackets, a lever formed of adjustable sections and pivoted to each upstanding bracket, a link pivoted at its lower end to each lever and pivoted at its upper end to the corresponding arm intermediate its ends, said floor having aligned slots through which said levers extend, the lower ends of said levers being forwardly curved, a brace rod connecting said forwardly curved ends of said levers, an operating lever connected to the floor, said floor having a slot through which said operating lever works, a rod pivoted at its forward end to the lower end of said operating lever, bars connecting the rear end of said rod with the forwardly curved lever ends, side supporting bars supporting, a seat, connecting links connecting the rear ends of said side supporting bars to the corresponding side members of the cover frame, the front end of each bar being pivoted to the upper end of a corresponding supporting rod, brackets fastened to the flooring of the body to which the lower ends of the supporting rods are pivoted, each of said rods being formed of sections adjustably connected together, said side bars lying adjacent said arms, lateral studs carried by said supporting bars which work in the bearing slots of said arms.

3. The combination with a motor vehicle body, the rear portion of which has a floor and is enclosed above and on the sides and rear forming a turtle deck having an opening in its upper part, a frame surrounding said opening, a cover for said opening having a frame formed with side members, said cover forming a back rest when moved into vertical position, upstanding brackets fastened to the floor, one on each side, a bearing member vertically adjustable in each bracket, the upper end of each bearing member being forwardly turned, arms pivoted at the rear ends to the forwardly turned ends of said bearing members, each arm having a lengthwise slot, brackets fastened to and depending from the under side of said cover, the other ends of said arms being pivoted to said depending brackets, a lever formed of adjustable sections and pivoted to each upstanding bracket, a link pivoted at its lower end to each lever and pivoted at its upper end to the corresponding arm intermediate its ends, said floor having aligned slots through which said levers extend, the lower ends of said levers being forwardly curved, a brace rod connecting said forwardly curved ends of said levers, an operating lever pivotally connected to the floor, said floor having a slot through which said operating lever works, a rod pivoted at its forward end to the lower end of said operating lever, bars connecting the rear end of said rod with the forwardly curved lever ends, side supporting bars supporting a seat, connecting links connecting the rear ends of said side supporting bars to the corresponding side members of the cover frame, the front end of each bar being pivoted to the upper end of a corresponding supporting rod, brackets fastened to the flooring of the body to which the lower ends of the supporting rods are pivoted, each of said rods being formed of sections adjustably connected together, said side bars lying adjacent said arms, lateral studs carried by said supporting bars which work in the bearing slots of said arms, said depending brackets and arms forming end guards for the seat when in active position.

In testimony whereof I have signed my name to this specification.

PITMANN A. BUCK.